Figure 1:
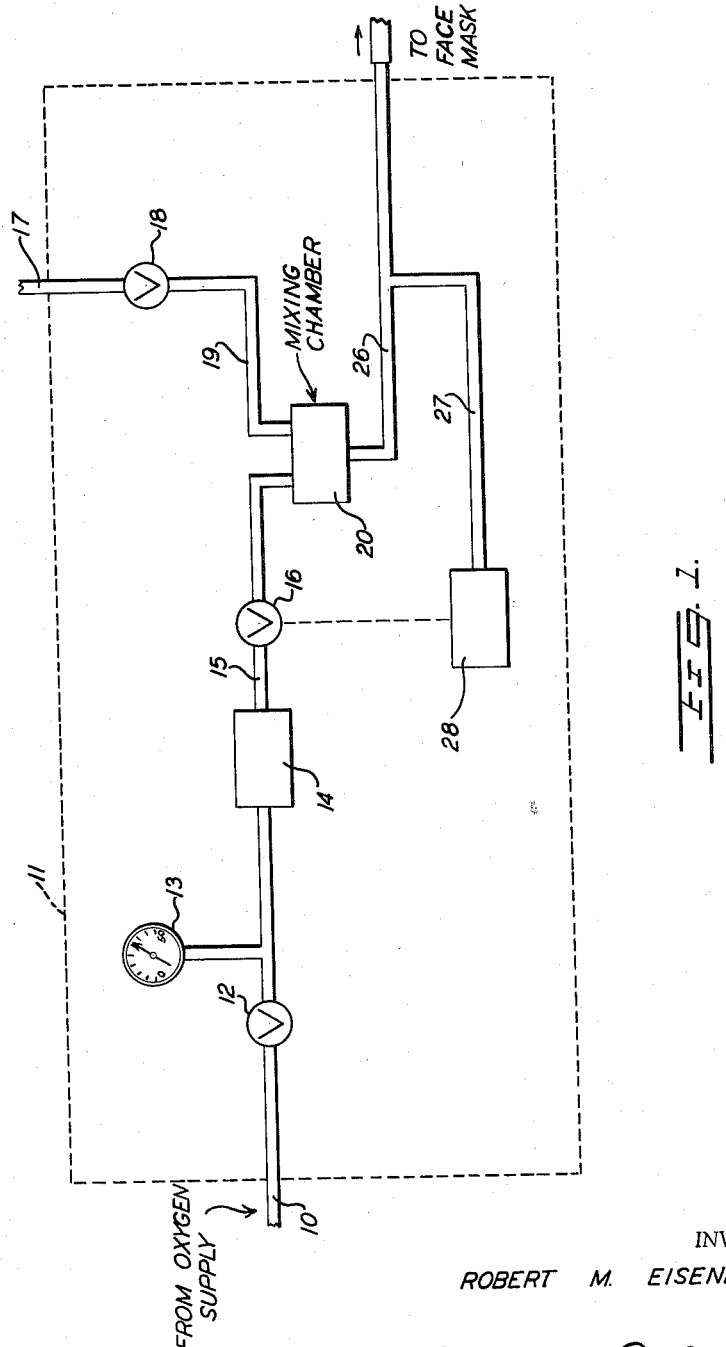

July 5, 1960 R. M. EISENBERG 2,943,401
SIMULATED OXYGEN REGULATOR SYSTEM
Filed Dec. 19, 1957 2 Sheets-Sheet 1

INVENTOR
ROBERT M. EISENBERG
BY Donald P. Smith
ATTORNEY

July 5, 1960 — R. M. EISENBERG — 2,943,401
SIMULATED OXYGEN REGULATOR SYSTEM
Filed Dec. 19, 1957 — 2 Sheets-Sheet 2

INVENTOR
ROBERT M. EISENBERG
BY Donald P. Smith
ATTORNEY

United States Patent Office 2,943,401
Patented July 5, 1960

2,943,401

SIMULATED OXYGEN REGULATOR SYSTEM

Robert M. Eisenberg, Rockville, Md., assignor to ACF Industries, Incorporated, New York, N.Y., a corporation of New Jersey Filed Dec. 19, 1957, Ser. No. 703,853

14 Claims. (Cl. 35—12)

This invention relates to a simulated pressure breathing system for training personnel and more particularly relates to simulated aircraft ground training system for representing high altitude operation of aircraft.

It will be understood that the invention hereinafter disclosed is of general utility in any training system wherein a variable, for example, pressure, is represented by a voltage or other circuit parameter and means responsive to variations in the parameter is used to control the gas pressure delivered to a face mask.

The invention will be illustrated as it relates to a simulated oxygen pressure breathing system for training aircraft personnel during conditions representing variable aircraft altitude during simulated flight. In actual aircraft having pressure breathing facilities a regulator is provided which serves to interconnect the oxygen supply to the inlet of the face mask and includes an off-on supply valve, a pressure gauge, a pressure reducer to lower the supply pressure to a safe value for breathing, and a mixing chamber wherein ambient air is mixed with oxygen from the supply in accordance with action of the bellows which is responsive to the frequency of breathing of the user to admit oxygen into the mixing chamber.

The present invention has for its principal object an improved and realistic system for simulating an oxygen pressure breathing system for the training of personnel.

A more specific object of the invention is an improved system for training aircraft personnel in the use of the oxygen pressure breathing system.

Another object of the invention is to provide a simulated oxygen pressure breathing system wherein a source of air controllable by means responsive to simulated aircraft altitude is fed to a face mask.

Summarily stated, the invention comprises broadly, a simulated oxygen pressure breathing system for training personnel consisting of a source of air under pressure higher than the ambient and connected to a face mask, and voltage deriving means responsive to a variable for deriving a parameter representing the instantaneous magnitude of the variable and connected to the air pressure source to control the air delivered to the mask. Indicators for representing the oxygen pressure and quantity are provided and an electrical system is connected to modify the positions of the indicators as the training cycle progresses.

This invention will be more fully exemplified in the following described embodiment and the features of novelty which characterize the invention will be pointed out with more particularity in the claims annexed to the specification.

Figure 2:
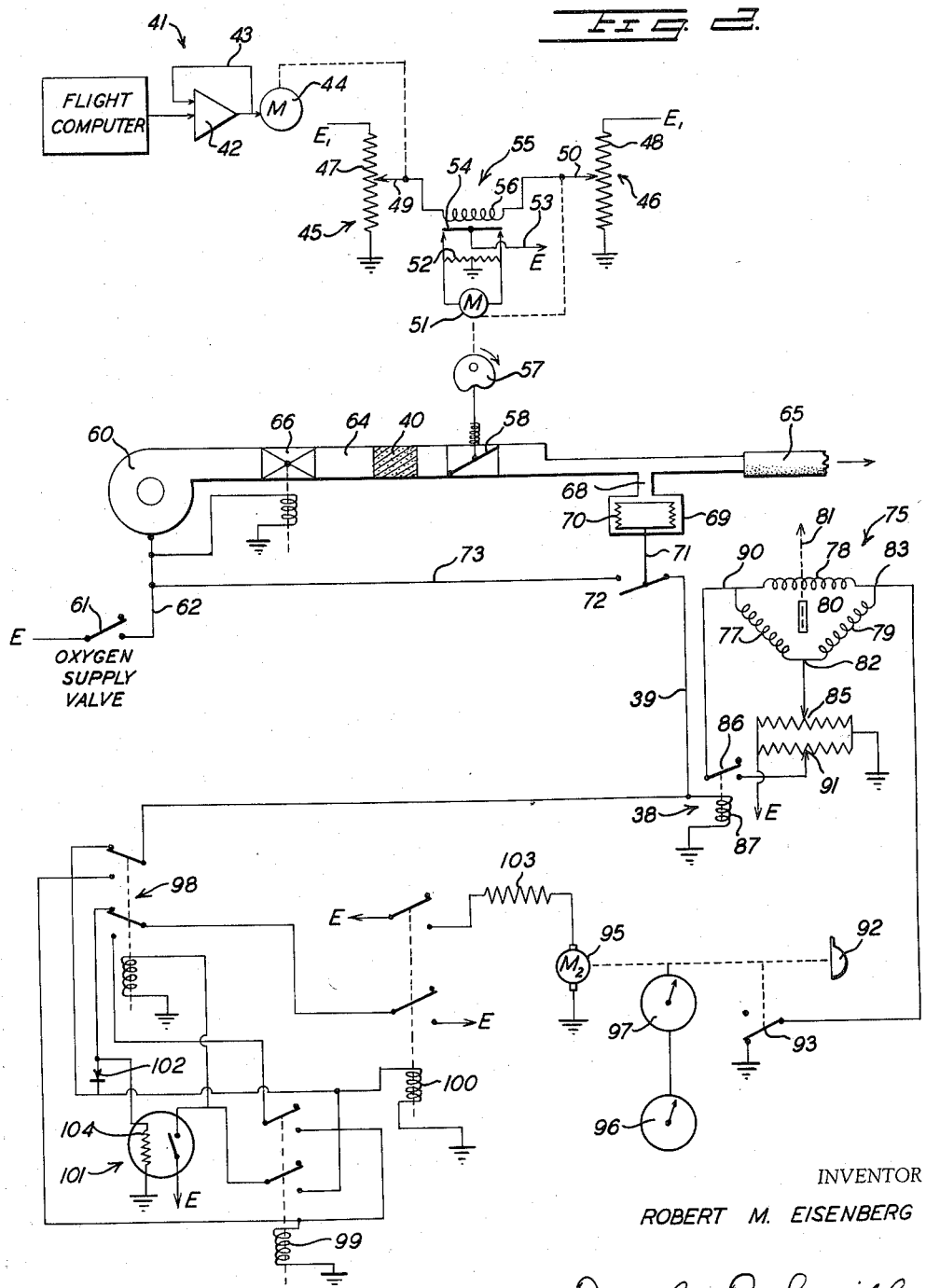

Referring now to the drawings wherein:

Figure 1 is a schematic representation of a prior art oxygen pressure breathing regulator as used in actual aircraft, and Figure 2 is a schematic view of the instant invention which simulates the system of Figure 1.

An automatic positive pressure diluter demand regulator is shown in Figure 1. Here an oxygen supply or bottle is connected to pipe 10 which enters housing 11 and has therein a manual off-on supply valve 12 and a pressure gauge 13 on the high pressure side of reducer 14. The pressure reducer 14 throttles the input pressure to a safe value, and pipe 15 connects between the output of the reducer and the input of a demand valve 16. A pipe 17 extends between the ambient air inlet and an aneroid valve 18 substantially as there shown. Pipe 19 interconnects the output of aneroid valve 18 with mixing chamber 20. Pipe 26 joins the output port of the mixing chamber 20 with the face mask, and pipe 27 leads into pipe 26 and connects at its other end to a pressure breathing bellows chamber 28 which is mechanically connected to demand valve 16. The person wearing the mask will manually turn the valve 12 to the "on" position and note the reading of the pressure gauge 13. A pressure of about 17 inches of water is maintained on the output of pressure reducer 14. The mixing chamber 20 receives the output through aneroid valve 18 which is responsive to the pressure existing within the aircraft cockpit to admit air into the mixing chamber. As the pilot breathes the slight pressure differential induced into conduit 26 acts upon a bellows and diaphragm in chamber 28 which is connected to valve 16 and opens the same and to admit oxygen into the mixing chamber 20 as demanded; whereby as the ambient pressure is reduced and the pilot inhales the pressure reduction in conduit 26 will open valve 16 proportional to a function of the ambient pressure, and the pilot is thereby provided with oxygen at a pressure sufficient to maintain normal body functions.

Referring now to Figure 2 wherein the actual system of Figure 1 is simulated, an electrical servo system of the integrating type is indicated by reference numeral 41 for representing the altitude of simulated flight, or the aircraft altitude. This servo system includes a summing amplifier 42 of conventional type having a feedback connection 43 to maintain straight line response and energized by a prior art flight computer which comprises a series of analog computers responsive to the positions of the controls of the simulated airplane to derive a voltage. The flight computer will feed a voltage representing the vertical airspeed which may be variable as to polarity and magnitude thereby representing positive or negative climb rates and is initiated by the trainee's manipulation of simulated controls in the cockpit into amplifier 42. The output of the amplifier 42 energizes a motor 44. The drawing diagrammatically illustrates the amplifier output as feeding directly into the motor armature but it will be understood that motor 44 may be a two phase squirrel cage motor having one phase energized by a fixed alternating current reference voltage dephased 90° with respect to the voltage output of amplifier 42. The output of amplifier 42 will energize the other winding of the motor and the direction and speed of rotation of the motor will depend on the phase relationship and magnitude of the voltage in the control winding which of course depends on the characteristics of the vertical air speed voltage computed in the flight computer hereinbefore discussed. Two potentiometers 45 and 46 having respective resistance windings 47 and 48 and wipers 49 and 50 are energized from identical sources of energy ($E_1$). Wiper 49 is mechanically connected to be driven by motor 44 and wiper 50 is driven by motor 51 which has a grounded center tapped field 52 and is reversibly rotatable through connection 53 brought to the rocker arm 54 of differential relay 55 which has winding 56 connected between the respective wipers 49 and 50. A mechanical connection from the shaft of motor 51 is joined to cam 57 which controls spring loaded valve 58 for a purpose that will presently be explained.

Considering the circuit described up to this point it will be seen that servo system 41 operates to derive a voltage in response to variations in altitude of a simulated flight which represent aircraft altitude to control motor 44. Wiper 49 moves along the length of resistance 47 thereby picking off a voltage proportional to altitude and applying the same to the coil 56 of differential relay 55. A voltage is also applied to the other end of coil 56 by wiper 50. The several voltages picked off from windings 47 and 46 applied to coil 56 in opposed relationship and a resultant flux is set up in the coil which will cause armature 54 to rock clockwise or counterclockwise depending on the relative strengths of the several voltages. When the armature 54 rocks it engages one or the other of two contacts (unreferenced) which connects through conductor 53 and permits current to flow through the selected winding of motor coil 52 and energize the armature of the motor thereby turning the same in a direction to move the wiper 50 until the voltages balance and the armature 54 swings back to neutral position. If for example the student pilot manipulates his controls to provide a definite vertical air speed output of the flight computer, amplifier 42 feeds such voltage into motor 44 thereby moving wiper 49 along the length of resistor 47 picking off a voltage in accordance with the position thereof. This voltage is fed to coil 56 and is different in magnitude from the voltage derived from wiper 50 in contact with resistor 48 whereby a resultant flux is set up in the coil 56 and armature 54 rotates to energize one or the other of the field windings and causes the armature of motor 51 to turn thereby moving wiper 50 to a position which picks off a voltage which is equal to the voltage picked off by wiper 49. This causes the neutralizing of flux in coil 56 and the armature 54 is returned by a spring (not shown) to its neutral position whereby the motor 51 stops. It will be noted that cam 57 is driven by motor 51 and accordingly a valve 58 is thereby opened or closed in accordance with the integrated vertical air speed or altitude.

The intake of a blower 60 is connected to an air conditioner to supply thereto cool filtered air. It is energized through switch 61 and conductor 62 to produce a pressure higher than ambient. Duct 64 connects between the blower 60 and flexible hose 65 leading to the trainee's face mask. A solenoid valve 66 is disposed in the conduit 64 and is opened and closed by coil 67 when the motor is started and stopped to thereby admit air under pressure into the duct. A filter 40 is provided to remove any oil or dust admitted by the system to this point and valve 58 previously mentioned in connection with the description of the flight computer opens and closes in accordance with simulated aircraft altitude to thereby admit variable pressure to the face mask. A pipe 68 leads from conduit 64 into a housing 69 which contains a bellow and diaphragm 70 responsive to variations in pressure to expand and contract in the usual well known manner and is connected by shaft 71 to switch 72 which is in series with a circuit 73 connected to conductor 62.

An indicator 75 for denoting or representing oxygen pressure is provided and consists of a standard D.C. selsyn having the usual delta connected coils 77, 78 and 79 and permanent magnet rotor 80 and having a pointer 81 mechanically connected thereto. This selsyn is so oriented that when no voltage is applied to the respective terminals the indication is at zero pounds pressure. Application of a voltage between terminals 82 and 83 causes a pressure indication value as determined from preset potentiometer 85. When switch 86 closes upon energization of coil 87 voltage is applied between terminals 82 and 90 and the pressure indication is decreased to a slightly lower value as determined by preset potentiometer 91. A control shaft knob 92 available to the instructor at his position is mechanically connected to switch 93 which will remove the ground from terminal 83 when the oxygen quantity is exhausted as will later be explained.

The oxygen quantity indicating instrument consists of a pair of synchros, the master being driven by a motor 95. The slave synchro 96 follows the indication of master in the usual well-known way. A mechanical interconnection is there shown in dotted line between motor 95, shaft knob 92, and master synchro 97 together with switch 93. Operation of motor 95 at a rate determined by resistor 103 during the training cycle turns the quantity indicators 97 and 96 and the knob in a direction indicating depletion of oxygen quantity at a rate which is a further function of the frequency of the trainee's breathing.

The electrical system interconnecting between switch 72 and motor 95 includes three standard multi contact relays 98, 99 and 100 and a time-delayed relay 101. When the student pilot inhales, switch 72 is closed upon action of bellows 70 drawing shaft 71 in an upward direction. Energy is applied through the normally closed upper contact of relay 98 to energize relay 100. Relay 100 then feeds back through a holding circuit a voltage to itself from its lower contact, through the lower contact on relay 98 and through a blocking rectifier 102. Switch 72 thereby loses control of relay 100. Voltage E is thus connected to resistor 103 which is the motor rate control resistor and to the motor 95 which is arranged to drive the quantity indicating synchro shaft 97 and knob 92 in a decreasing direction as previously explained. The same voltage, E, is applied to the control element 104 of time-delay relay 101. After the required time delay, the contacts of relay 101 close thereby energizing relay 98 which removes the voltage from the coils of relays 100 and 101. If the trainee is at this time no longer demanding oxygen the motor 95 stops running and the quantity as indicated by the instruments remain static. If however the trainee is still using oxygen the switch 72 will be periodically closing and voltage passes through the upper contacts of relay 98 (now energized) and energizes relay 99. Relay 99 is held closed through its own feedback circuit and the contacts of relays 98 and 100. Relay 100 is energized through the contacts of relay 99 and 101 thereby causing the motor 95 to be energized. The relay 100 remains energized until time delay relay 101 opens which opens continuity to the coil of relay 98. The circuit is then restored to the original status and if the pilot is still using oxygen the whole cycle is repeated. This operation gives a smooth simulated depletion rate of oxygen quantity by running the motor continuously and sampling whether there is a demand or not at a rate determined by the time delay relay 101. If the motor 95 is permitted to run until the simulated oxygen supply is exhausted; upon reaching the zero position switch 93 is opened by a cam on the shaft from motor 95 thereby removing voltage from selsyn 75 and the pressure indicator 81 drops to the zero position. This is a proper simulation for a system of this type when liquid oxygen is used because the pressure is substantially constant as the liquid phase converts to the gas phase and only upon complete exhaustion of the liquid does the pressure decrease to zero. In an actual aircraft 8 liters of liquid oxygen is provided per crew member. An average breath uses 0.000833 liter and at the normal respiration rate the bottle will last for 8 hours. Since a training flight using a simulator seldom lasts more than one hour the showing of the quantity indicators do not decrease appreciably in the usual cycle.

The operation of the entire system is as follows:

During the training flight the manipulation of the flight controls by the trainee serves to compute values of vertical airspeed which are fed into amplifier 42 and drive motor 44 at a rate and to a degree proportional to the altitude gained or lost by the simulated craft. A voltage from wiper 49 is fed into the coil of the differential relay 55 where it prevails over the voltage impressed from wiper 50 and the armature 54 rocks in one direction or the other to energize motor 51 to thereby open or close the valve 58 in conduit 64. When the pilot wishes oxygen he turns valve 61 which starts blower 60 and opens valve 66 by energizing coil 67. The motor driving blower 60 is a constant speed motor and the pressure reaching filter 40 is constant. Throttling is done by valve 58 in accordance with the magnitude of the simulated craft altitude as computed by the before described flight computer. In conduit 64 on the downstream side of valve 58 the air pressure delivered to the mask through flexible conduit 65 is controlled in accordance with the aircraft altitude in the same manner that the prior art regulator controls the pressure by the aneroid valve 18 (see Figure 1). Conductor 39 leading from switch 72 conveys the voltage from the source into the electrical system, encompassing the relays and indicators hereinbefore described. As the trainee inhales and exhales the bellows 70 expands and contracts in the same manner as the prior art bellows 28 of Figure 1 and shaft 71 connected to switch 72 thereby opens and closes the switch in accordance with the frequency of the trainee's breathing. Thus coil 87 of relay 38 is periodically opened and closed thereby applying and removing voltage to terminal 90 of indicator 75 causing pointer 81 to move back and forth representing a variation in pressure as the trainee breathes, in the same manner that the pressure gauge in the actual regulator moves as the pilot breathes. The electrical system encompassing relays 98, 99, 100 and 101 causes motor 95 to drive the selsyn pair 96 and 97 to a decreasing value as the training cycle progresses thereby representing quantity of oxygen depletion. If the instructor desires to simulate leakage of the gas system he will turn knob 92 in the instructor's station thereby reducing the showings of indicators 96 and 97 to the empty position to observe the reaction of the trainee and determine what his efforts are to correct the situation. Upon depletion of the last remaining liquid oxygen in the actual system the pressure drops to zero. This is simulated in the disclosed system by the opening of switch 93 by motor 95 when the quantity is indicated by 96 and 97 becomes zero. Thus the voltage is removed from terminal 83 of indicator 75 and the pointer 81 drops to the position representing zero pressure.

It will therefore be seen that the disclosed embodiment simulates an oxygen pressure breathing system in a realistic and practical manner for the training of aircraft personnel. The pressure and quantity indicators would normally be located in the trainer cockpit which of course may be of a conventional type.

The herein described invention is not limited to the illustrated embodiment but is applicable as a training device for simulating the use of underwater breathing apparatus, inhalation apparatus for administering therapeutic agents to patients through the use of a face mask, and any type of respiratory apparatus wherein the applied pressure varies as the function of a variable.

I claim:

1. A simulated oxygen pressure breathing system for training aircraft personnel comprising a source of air under pressure higher than ambient connected to a face mask worn by the trainee, deriving means responsive to variations in altitude of a simulated flight for deriving a voltage representing aircraft altitude, means responsive to said deriving means to control the air pressure delivered to the mask, an indicator for representing oxygen pressure, means responsive to trainee's demand for oxygen to periodically change the pressure representation in accordance with the frequency of the trainee's breathing, an indicator for representing oxygen quantity and means for modifying the position of the said oxygen quantity indicator.

2. A simulated oxygen pressure breathing system for use in a simulated aircraft for training personnel comprising means adjustable according to simulated flight altitude, means responsive to said first recited means to control air pressure delivered to a face mask worn by the trainee, a plurality of indicators respectively representing oxygen pressure and oxygen quantity, and an electrical system including means responsive to the trainee's demand for oxygen for modifying the showings of the respective indicators.

3. A simulated oxygen pressure system for use in a simulated aircraft for training personnel comprising means adjustable according to simulated flight altitude, means responsive to said first means to control air pressure delivered to a mask worn by the trainee, a plurality of indicators respectively representing oxygen pressure and oxygen quantity, and an electrical system including means responsive to the trainee's demand for oxygen for modifying the showings of the indicators and for periodically determining the existence of oxygen demand.

4. A simulated oxygen pressure system for use in a simulated aircraft for training personnel comprising deriving means adjustable in accordance with variations in altitude of simulated flight, means responsive to said deriving means to control air pressure delivered to a mask worn by a trainee, a first indicator representing oxygen pressure, a second indicator representing oxygen quantity, means connected to the mask and responsive to trainee's demand for oxygen to modify the showing of the respective said pressure and quantity indicators, and an electrical system interconnecting between the said last recited means and the said indicators.

5. A simulated oxygen pressure breathing system for training aircraft personnel comprising a source of air under pressure, means to connect the pressure source to a mask worn by the trainee, deriving means responsive to variations in altitude of a simulated flight for deriving a voltage representing aircraft altitude, means responsive to said deriving means to control the air pressure delivered to the mask, an indicator for representing oxygen pressure, an indicator for representing oxygen quantity, means responsive to trainee's demand for oxygen to periodically change the pressure representation in accordance with the frequency of the trainee's breathing, and an electrical system connected to the said last recited means to modify the position of the quantity indicator as the training cycle progresses.

6. A simulated oxygen pressure breathing system for training aircraft personnel comprising a source of air under pressure, means to connect the pressure source to a mask worn by the trainee, voltage deriving means responsive to variations in altitude of a simulated flight for deriving a voltage representing aircraft altitude, means responsive to said deriving means to control the air pressure delivered to the mask, an indicator for representing oxygen pressure, an indicator for representing oxygen quantity, means adjustable by an instructor for modifying the showing of said last named indicator, and an electrical system including means responsive to the trainee's demand for oxygen to modify the showing of the respective indicators as the training cycle progresses.

7. The invention as set forth in claim 6 wherein the said voltage deriving means comprises a servo system including a first and second potentiometer each having a wiper and a resistance winding energized by a fixed voltage, a differential relay connected between the wipers, a reversible motor controlled by said relay, the first wiper being moved along its associated resistance winding in accordance with variations in altitude of simulated flight, the second wiper being driven by said motor in a direction to reduce the voltage differential applied to the differential relay.

8. The invention as set forth in claim 7 wherein the said air pressure control means comprises a valve disposed in the pressure source connecting means and driven by the said reversible motor.

9. The invention as set forth in claim 8 wherein the means responsive to trainee's demand for oxygen comprises a pressure sensitive bellows and diaphragm connected to a switch in the said electrical system.

10. The invention as set forth in claim 9 wherein the said electrical system includes a motor to drive the said oxygen quantity indicator.

11. A simulated oxygen pressure breathing system for training personnel comprising a source of air under pressure higher than ambient connected to a face mask, deriving means responsive to the function of a variable for deriving a voltage representing the instantaneous magnitude of the variable, means responsive to said deriving means to control the air delivered to the mask, an indicator for representing oxygen pressure, means responsive to demand for oxygen to periodically change the pressure representation, an indicator for representing oxygen quantity, and means for modifying the position of said oxygen quantity indicator.

12. A simulated oxygen pressure breathing system for training personnel comprising a source of air under pressure higher than ambient connected to a face mask, deriving means responsive to the function of a variable for deriving a voltage representing the instantaneous magnitude of the variable, valve means connected to said deriving means and responsive thereto to control the air delivered to the mask, a plurality of indicators respectively representing oxygen pressure and oxygen quantity, and an electrical system including means responsive to demand for oxygen for modifying the showings of the respective indicators.

13. A simulated oxygen pressure system for training personnel comprising a servo system adjustable according to the function of a variable, a source of air under relatively elevated pressure connected to a face mask worn by the trainee, means responsive to the said servo system to control the air pressure delivered to the mask, an oxygen pressure representing indicator, an oxygen quantity representing indicator, and an electrical system including means responsive to the trainee's demand for oxygen and connected to the said indicators for modifying the showing of the indicators and for periodically determining the existence of oxygen demand.

14. A simulated oxygen pressure system for use in a simulated aircraft for training personnel comprising an electrical servo system adjustable according to simulated flight altitude, a source of air under pressure, means connecting the said pressure source to a face mask worn by a trainee, means responsive to the said servo system to vary the air pressure delivered to the face mask, an indicator for representing oxygen quantity remaining and an electrical system including means responsive to trainee's demand for oxygen and connected to said indicator to modify the showing of the indicator during the training cycle.

References Cited in the file of this patent

UNITED STATES PATENTS

| | | |
|---|---|---|
| 2,435,181 | Lindsay | Jan. 27, 1948 |
| 2,475,132 | Ergen | July 5, 1949 |
| 2,627,675 | Kittredge | Feb. 10, 1953 |
| 2,724,192 | Stern et al. | Nov. 22, 1955 |